(12) United States Patent
Tippery et al.

(10) Patent No.: US 7,614,206 B2
(45) Date of Patent: Nov. 10, 2009

(54) WINGED HEADER APPARATUS AND METHOD FOR A COMBINE

(75) Inventors: Steve Tippery, Gretna, NE (US); Maurice Salz, Honey Creek, IA (US); Craig Kaster, Omaha, NE (US); Jens Petersen, Omaha, NE (US)

(73) Assignee: Claas Selbstfahrende Erntemaschinen GmbH (DE)

( * ) Notice: Subject to any disclaimer, the term of this patent is extended or adjusted under 35 U.S.C. 154(b) by 0 days.

(21) Appl. No.: 11/757,597

(22) Filed: Jun. 4, 2007

(65) Prior Publication Data

US 2008/0295473 A1 Dec. 4, 2008

(51) Int. Cl.
*A01D 34/00* (2006.01)

(52) U.S. Cl. ............... 56/15.8; 56/DIG. 3; 56/DIG. 10

(58) Field of Classification Search ............... 56/15.8, 56/16.2, 16.3, 228, DIG. 10, 134, 159, 181, 56/187, 188, 208, 209, DIG. 3
See application file for complete search history.

(56) References Cited

U.S. PATENT DOCUMENTS

| | | | | |
|---|---|---|---|---|
| RE331 E | * | 11/1855 | Haines | 56/188 |
| 136,940 A | * | 3/1873 | Roberts | 56/159 |
| 2,455,905 A | | 12/1948 | Ronning et al. | |
| 3,468,107 A | * | 9/1969 | van der Lely | 56/11.9 |
| 4,177,626 A | | 12/1979 | McNaught | |
| 4,300,333 A | | 11/1981 | Anderson | |
| 4,316,511 A | * | 2/1982 | Andersen | 172/776 |
| 4,409,780 A | * | 10/1983 | Beougher et al. | 56/228 |
| 4,446,683 A | * | 5/1984 | Rempel et al. | 56/296 |
| 4,487,004 A | * | 12/1984 | Kejr | 56/14.4 |
| 4,750,440 A | * | 6/1988 | Pollard et al. | 111/151 |
| 4,825,958 A | * | 5/1989 | Kelderman | 172/413 |
| 4,938,010 A | | 7/1990 | Guinn et al. | |
| 5,005,343 A | | 4/1991 | Patterson | |
| 5,067,264 A | * | 11/1991 | Beeley | 37/222 |
| 5,243,810 A | | 9/1993 | Fox et al. | |
| 5,687,798 A | * | 11/1997 | Henry et al. | 172/311 |
| 6,209,297 B1 | | 4/2001 | Yeomans et al. | |
| 6,412,258 B1 | * | 7/2002 | Doerflinger | 56/7 |
| 6,675,568 B2 | * | 1/2004 | Patterson et al. | 56/208 |
| 6,817,166 B2 | | 11/2004 | Dunn | |

(Continued)

FOREIGN PATENT DOCUMENTS

EP 0789990 A1 8/1997

*Primary Examiner*—Thomas B Will
*Assistant Examiner*—Joan D Misa
(74) *Attorney, Agent, or Firm*—Robert C. Haldiman; Husch Blackwell Sanders LLP (57) ABSTRACT

A header for a combine or a harvester comprising a center portion of said header having a feeder house position disposed to direct cut crop from the center portion to a feeder house when the header is mounted on the feeder house. At least one lateral portion of the header is attached to the center portion by a frame hinge. A draper comprised of a frame and a belt disposed to rotate over the frame extends from the lateral portion to the center portion having a draper hinge. A cutter having a curving portion is disposed at a leading aspect of the header to cut crop. The frame hinge, draper hinge and curving portion along the same axis are parallel to a direction of travel of the combine or harvester. The lateral portion can raise and lower relative to the center portion by rotation around the axis.

17 Claims, 13 Drawing Sheets

U.S. PATENT DOCUMENTS

| | | |
|---|---|---|
| 6,865,871 B2 | 3/2005 | Patterson et al. |
| 2002/0129591 A1 | 9/2002 | Patterson et al. |
| 2004/0148919 A1 | 8/2004 | Dunn |
| 2005/0016147 A1 | 1/2005 | Patterson et al. |
| 2007/0056755 A1* | 3/2007 | Pederson et al. ............ 172/311 |
| 2007/0193243 A1* | 8/2007 | Schmidt et al. ................ 56/181 |
| 2008/0072560 A1* | 3/2008 | Talbot ......................... 56/208 |

* cited by examiner

WINGED HEADER APPARATUS AND METHOD FOR A COMBINE

BACKGROUND OF THE INVENTION

1. Field of the Invention

The present invention is in the field of headers, particularly draper headers for combines and harvesters.

2. Related Art

In the harvesting of commodity crops, there is a continuous need in the art for increasing speed. Accordingly, larger combines and harvesting machines having wider headers are increasingly preferred by farmers. The advantage of cutting more crop per distance traveled by a combine with a wide header, however, is often offset if the header is harvesting crop on uneven ground. The reason is that a single, wide, rigid header cannot maintain a continuous, optimal height of a cutter bar and header table that is cutting crop growing in uneven ground. It is advantageous to maintain a consistent height at which crops are cut. If a wide, rigid header harvests across a crest or trough in the ground that is less wide than the header, there will be areas in which the crop is cut at a lower and/or higher level than the crop cut elsewhere along the width of the header. Hence, there is a need in the art for wide headers that maintain a constant elevation at which the crop is cut across their entire width.

In order for a header to flex in a manner that will optimize the maintenance of a consistent crop cutting elevation across its width, a hinge, joint or curving portion in the header would ideally be placed as close to the ground as possible. There is a need in the art for a flexing header or a winged header wherein a flexing or jointed feature is as close to the bottom of the header or to the ground as possible.

Mechanically, it is advantageous if a header that will flex or float have a hinge or joint capability that is in substantial alignment through all of the relevant mechanical elements of the header. Thus, there is a need in the art for a frame hinge together with a draper hinge and a bending component in a cutter bar that are substantially in alignment.

There is a continuing need in the art for robust components that are durable enough to continue functioning through impacts and other consequences of rough usage. There is a further continuing need for economy of use and manufacture and ease of repair.

Those of skill in the art of manufacturing combine and harvester headers will recognize that headers destined for some uses do not need a hinged or floating feature and may be marketed or operated in a rigid configuration, whereas others would advantageously have a hinged wing feature. There is a continuing need in the manufacturing art for consolidating common parts fabrication and assembly steps for various optional end products. Accordingly, there is a need in the manufacture of combine and harvester headers for a header that can be optionally manufactured and sold in a rigid configuration or in a hinging configuration with a minimal amount of extra parts to manufacture and extra assembly steps to perform in order to produce the various versions of the header. Hence, there is a need in the art for a simple and rapid device for converting a hinged wing header to a rigid header and vice versa.

SUMMARY OF THE INVENTION

The present invention is a header for a combine or a harvester having a center portion with a feeder house position disposed to direct cut crop from the center portion to a feeder house when the header is mounted on the feeder house. At least one lateral portion of the header is attached to the center portion by a frame hinge. A draper comprised of a frame and a belt disposed to rotate over the frame extends from the lateral portion to the center portion. The draper has a draper hinge. A cutter bar is disposed at a leading aspect of the header to cut crop. The cutter bar has a curving portion where the cutter bar can bend. The frame hinge, draper hinge and curving portion are substantially along the same axis. That axis is substantially parallel to a direction of travel of the combine or harvester. The lateral portion can raise and lower relative to the center portion by rotation around the axis.

Rotation of the lateral portion around the hinge may be actuated and/or dampened by a hydraulic cylinder and/or springs disposed between the center portion and lateral portion of the header and remote from the hinges. A locking bracket may convert the header between a hinged configuration and a rigid configuration. The locking bracket may be separate or hingedly attached to the header frame.

A three sectioned flexing reel is provided. Each section of the reel is mounted to a separate portion of the header. A center shaft of each reel is driven, and the center shafts of the three reels are connected with U-joints. In order to accommodate the flexing of the reel, at least one center shaft is provided on each reel with a telescoping link to the center shaft of a next reel section. In this fashion, an advantageous consistent spacing can be maintained between the lower most aspect of the reel and the header cutting system beneath it.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
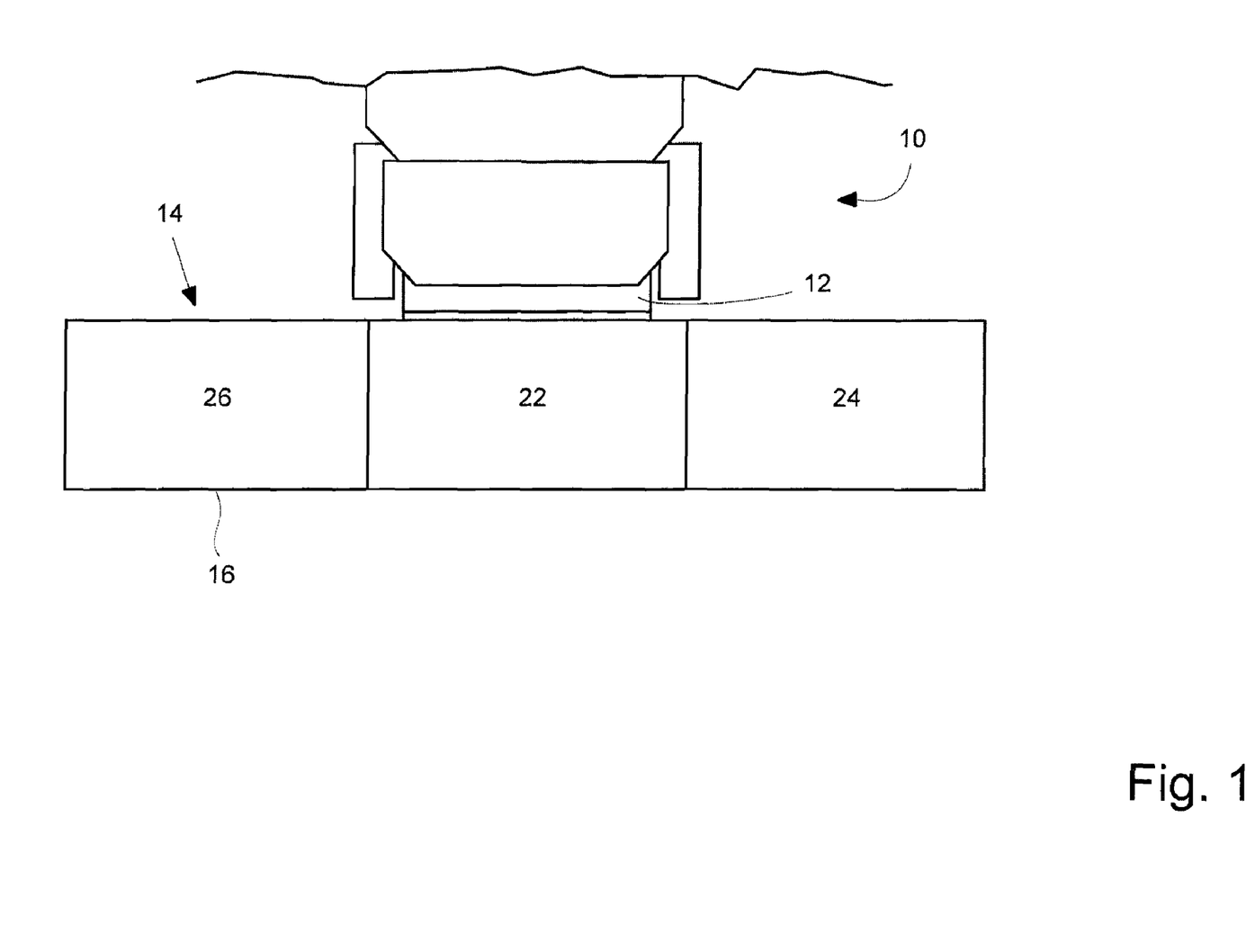
FIG. 1 is a schematic top view of a combine.

Referring now to the drawings in which like reference numbers indicate like elements, FIG. 1 is a top schematic view of a combine or harvester 10 having a feeder house 12 and a header 14. At the leading edge of the header 14 is a knife and cutter bar 16. The header receives the cut crop and transports it through the feeder house 12 into the combine where it is threshed. The depicted embodiment of the present invention is a header using two lateral conveyor belts, sometimes known to those of skill in the art as "drapers", to convey cut crop from the laterally extended portions of the header towards the center of it and then from the center back into the feeder house 12. The lateral conveyor belts 18 transport cut crop medially to the center of the header where an auger propels the crop rearwards and into the feeder house.

Figure 2:
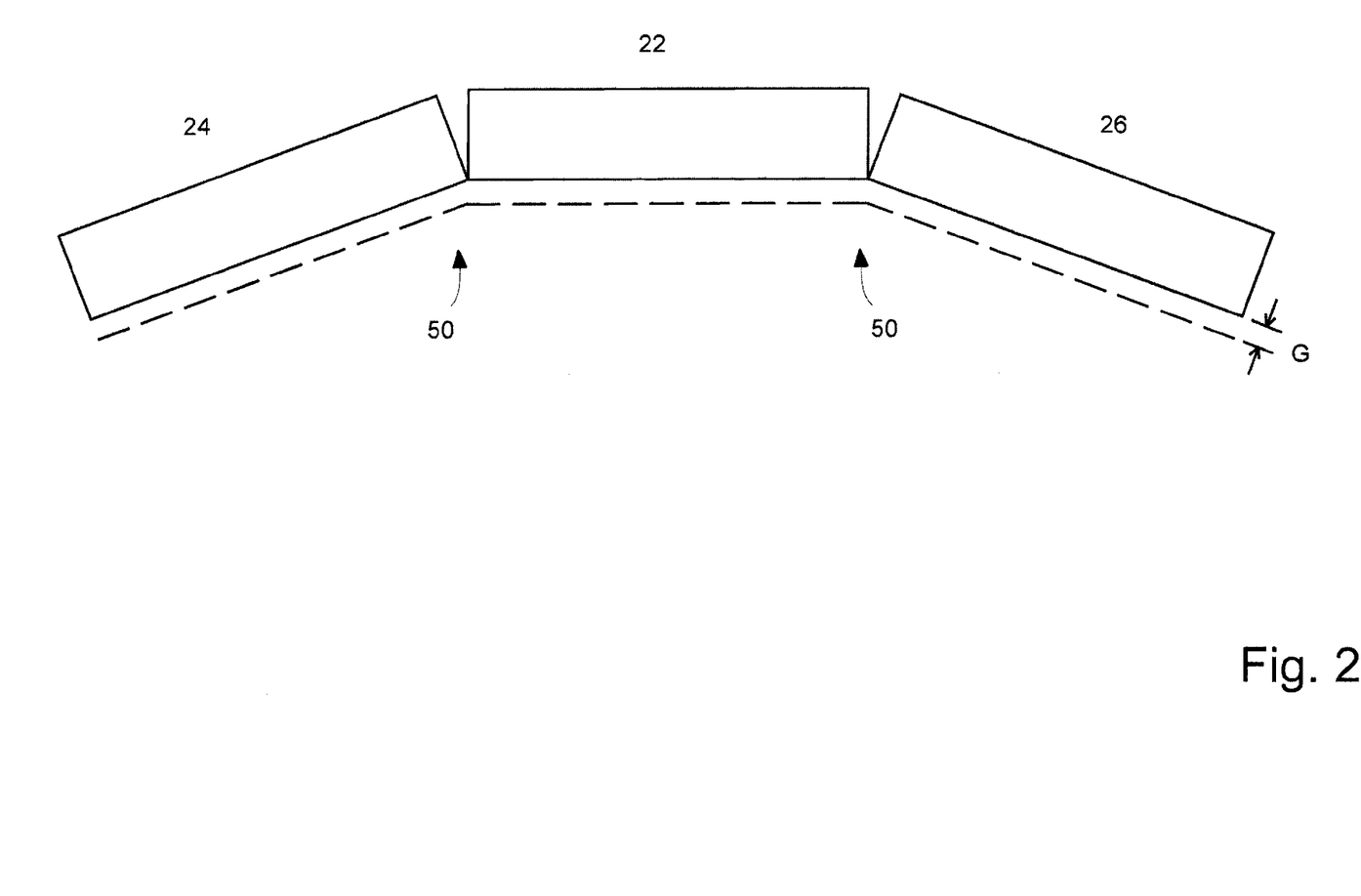
FIG. 2 is a schematic front view of a draper header.

FIG. 2 is a schematic front depiction of the header of the present invention. Center portion 22 is flanked by lateral portions 24 and 26. At hinges 50, the relationship between the three changes by the lateral portions rotating around the hinges in order that the frame, table and cutter bar of the header overall more closely follows the changing surface of the terrain, represented by the dotted line. The lateral portions may flex downward to accommodate a rise in the center ground, rise to accommodate a depression in the center ground or one lateral portion may rise while the other one falls to accommodate uneven terrain. In this manner, a relatively consistent distance, indicated by the dimension G in FIG. 2, is maintained between the bottom of the header and the ground beneath it. In one embodiment, only the center portion 22 is attached to the overall agricultural machine which supports the entire header. Accordingly, the weight of the entire header and machine may be supported on the ground by wheels in alignment with only center portion 22 in the FIG. 3 embodiment. It is within the scope of the invention that outside wheels could also be an option on the outside wings to cushion wing motion.

Figure 3:
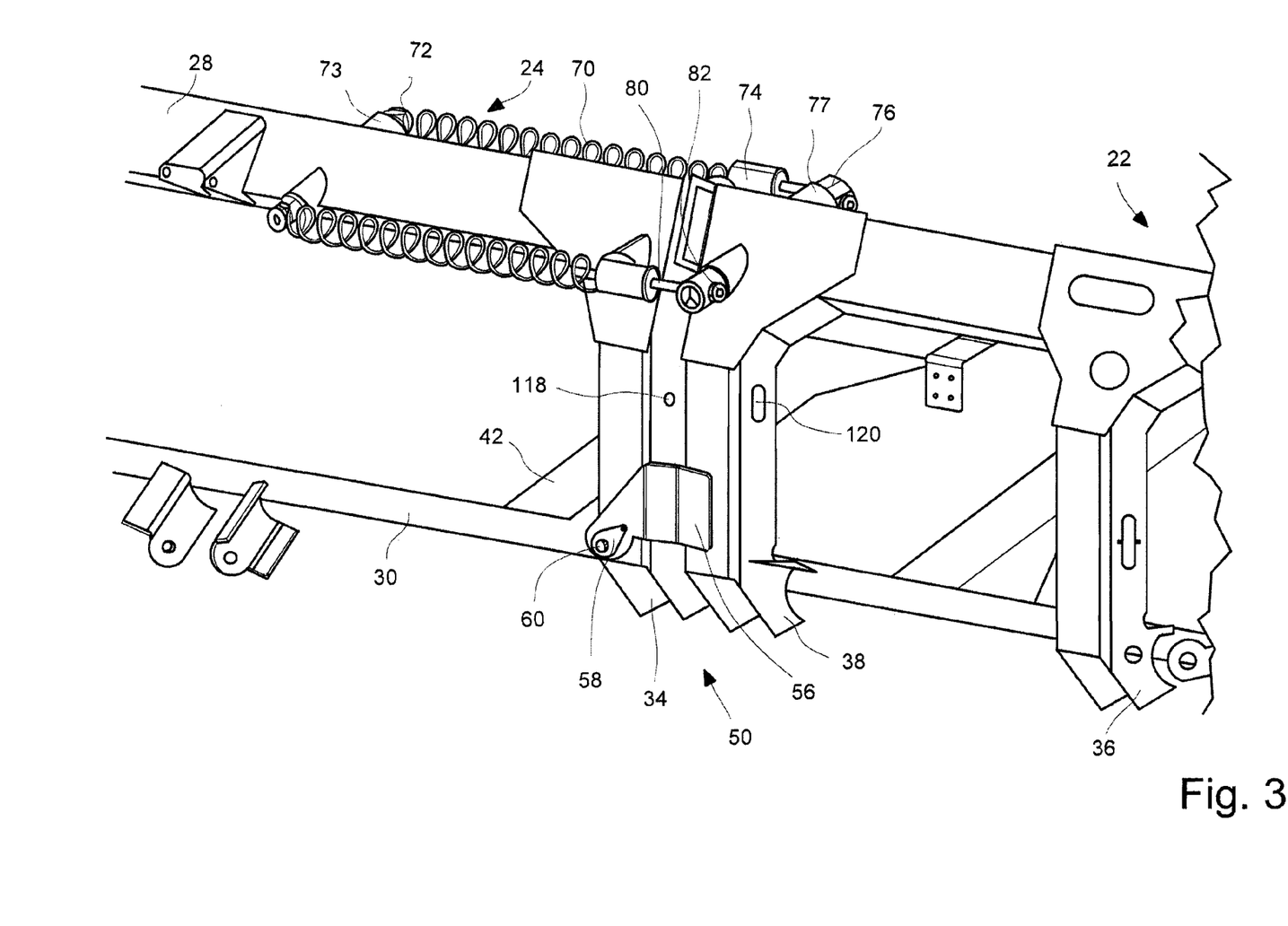
FIG. 3 is a rear perspective view of a portion of a hinged wing header.

As seen in FIG. 3, the header 14 has a central section 22 and a left hand lateral section 24 and a right hand lateral section 26. Each of these three sections includes a top rail 28, and a plurality of vertical members. In the depicted embodiment, the header also has a lower rail 30. In FIG. 3, left handed lateral head portion 24 has outer vertical members and one innermost or medial vertical member 34. Central head portion 22 has a plurality of vertical members as well including, just outside the feeder house a vertical member 36 and a lateral most vertical member 38, nearest the junction of central portion 22 and lateral head portion 24. Table supports 42 are fixedly attached to bottom rail 30 and disposed to support a table for receipt of cut crops or, as in the depicted embodiment, a conveyor belt which serves as a table.

The lateral portions 24 and 26 are attached to the central portion 22 of the header by a hinge 50. Frame hinge 50 is of sufficient strength to support the entire weight of its corresponding lateral member 24 or 26. Frame hinge 50 is comprised of a pin 52 and bushing 54, seen in cross section in FIGS. 4 and 5. The bushing 54 is mounted in one or the other of the corresponding vertical members 34 or 38 and pin 52 is inserted through it. In the depicted embodiment, pin 52 and bushing 54 are within vertical member 34. Hinge 50 is further comprised of hinge plates 256A and 256B which are fixedly attached, as by welding, to the other of the paired vertical members, which is vertical member 38 in the depicted embodiment, on the lateral aspect of the central portion 22. Pin 52 is retained rearwardly by washer 58 and bolt 60.

Figure 4:
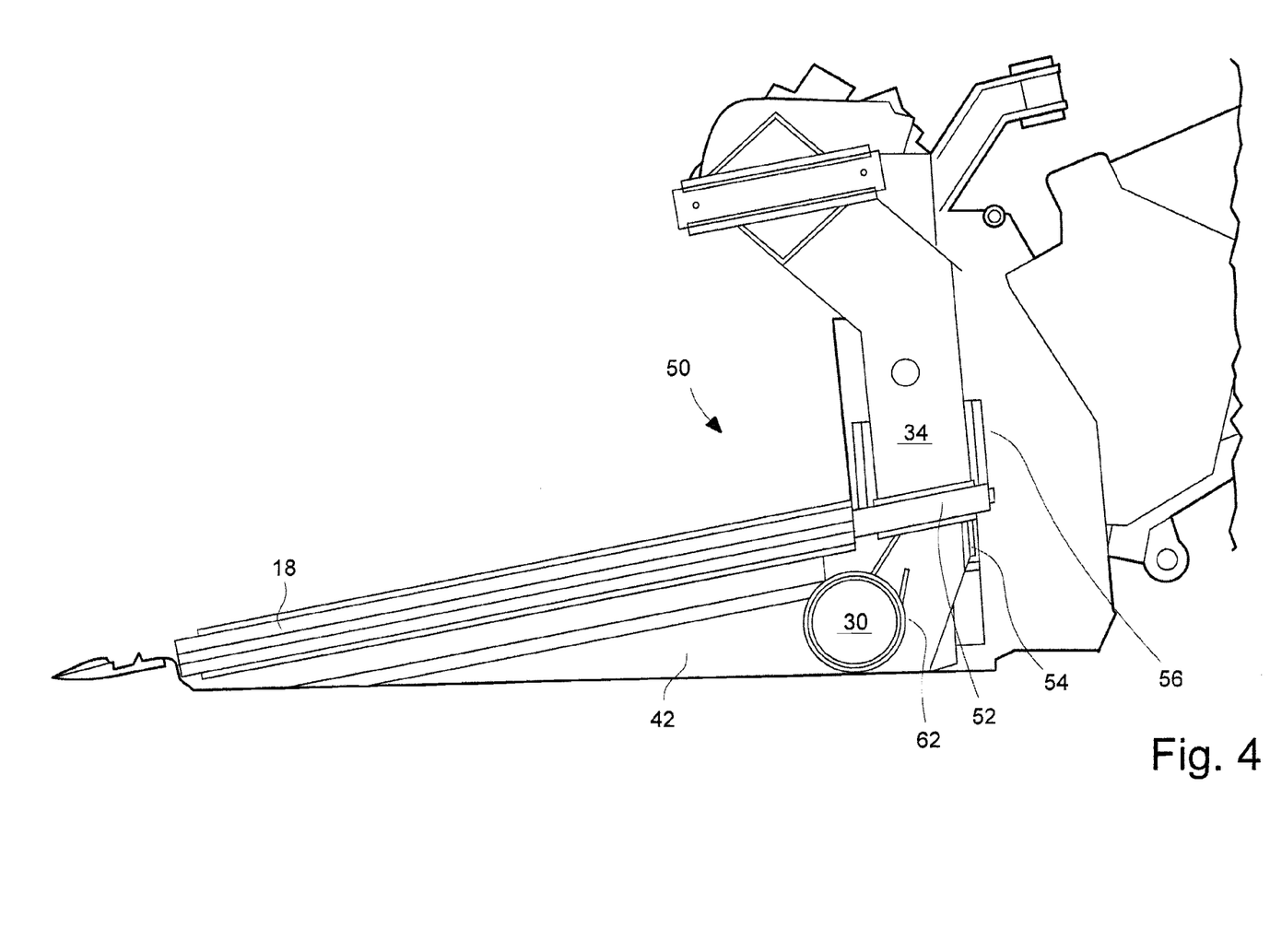
FIG. 4 is a cutaway side view of the engagement of the lateral portion and central portion of a hinged wing header.
Figure 5:
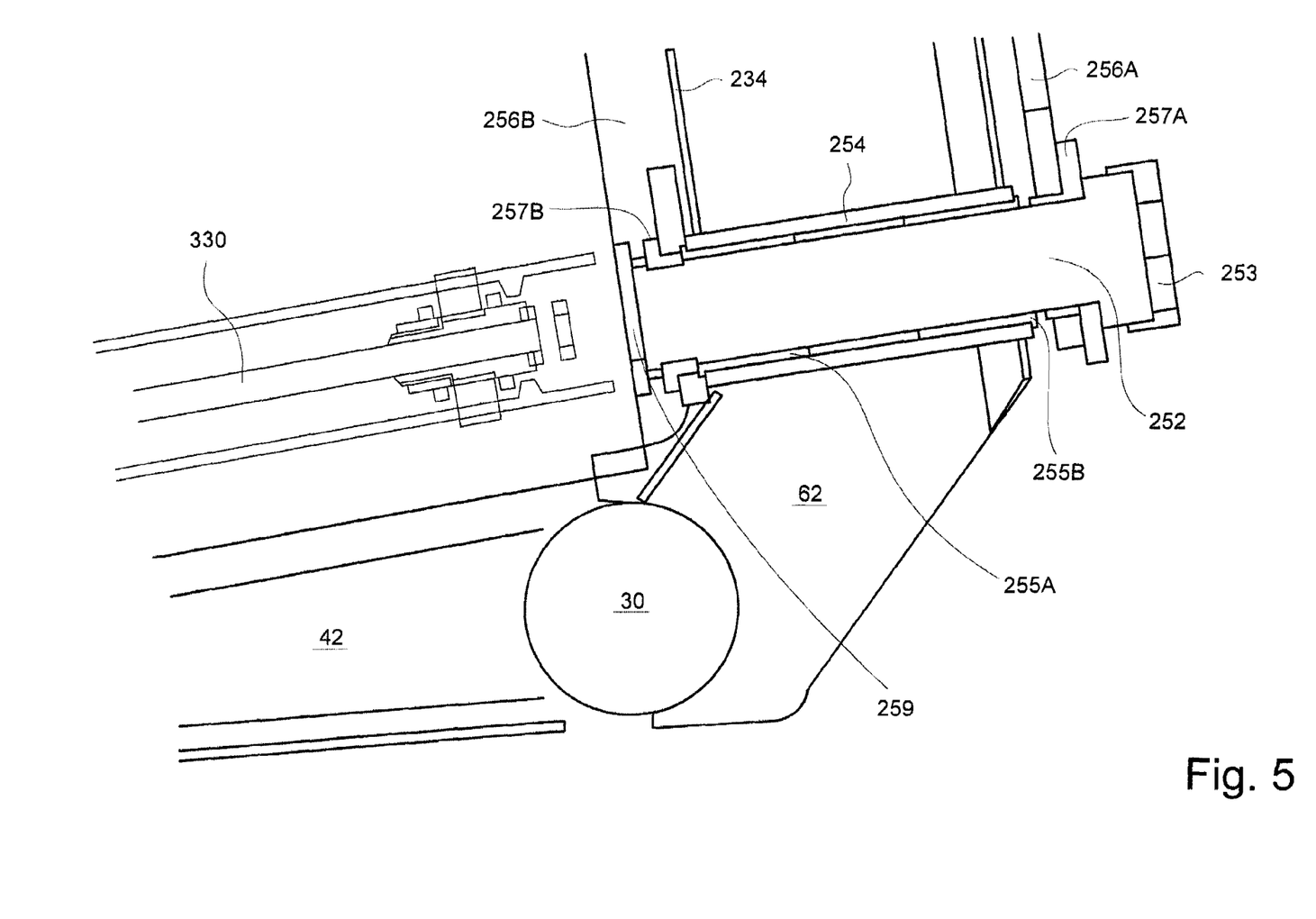
FIG. 5 is a close up cross-section of a frame hinge.

As is apparent from FIGS. 4 and 5, pin 52 is aligned with the plane of the draper belt 18. As is also apparent, the hinge assembly 50 is positioned in a low position on the profile of the cross section of the header, having only the lower rail 30, table support 42 and an extension 62 of the vertical member 34 which connects to the lower rail 30 underneath the pin 52.

In proportional terms, the pin in the depicted embodiment is located in the lower 25% of the overall height of the header 14. This low position further promotes maintenance of a consistent gap dimension between the bottom of the header and the ground.

Figure 6:
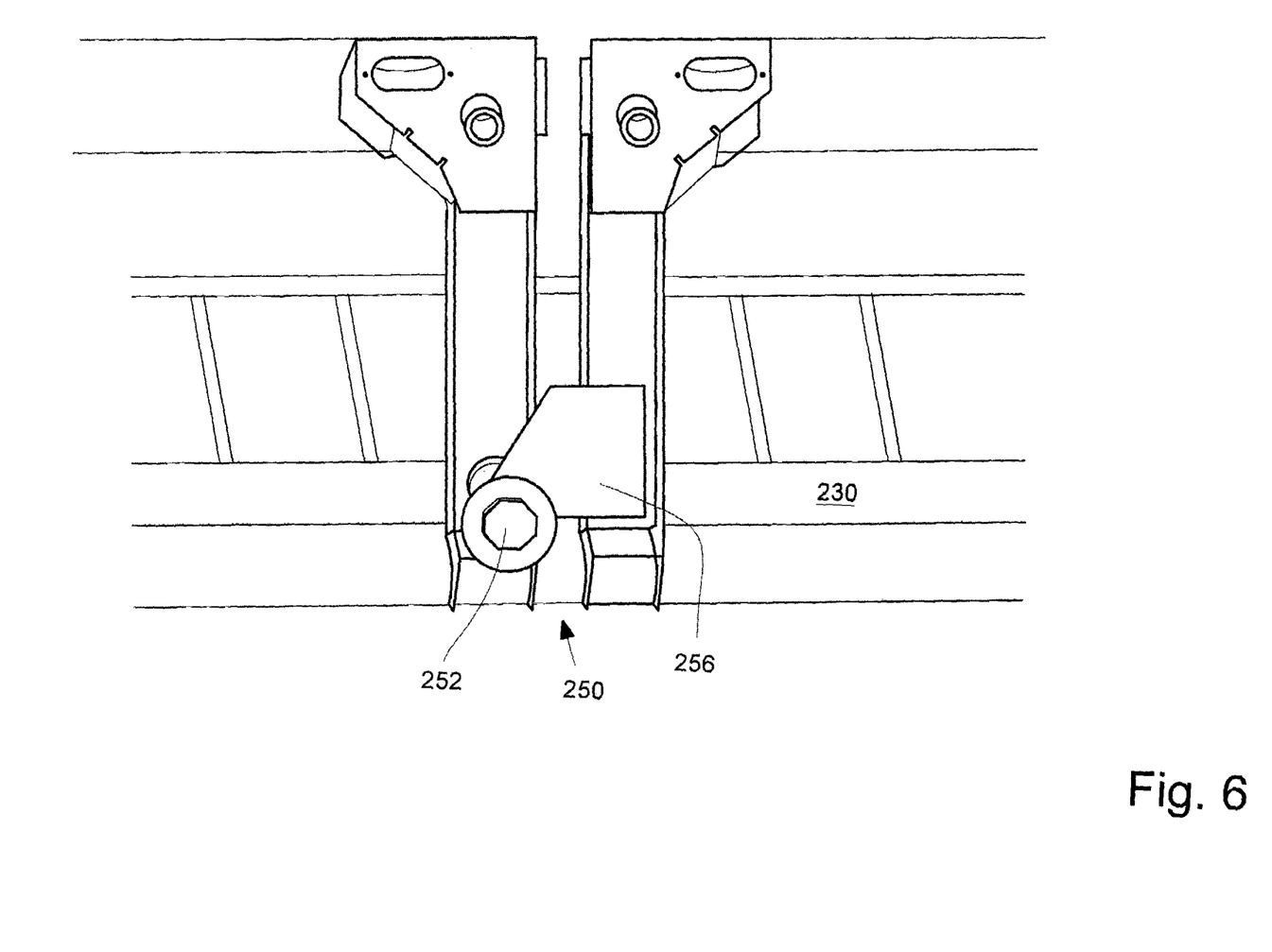
FIG. 6 is a perspective rear view of a second embodiment of the hinge.

A second embodiment of the hinged pin is depicted in FIGS. 5 and 6. There, pin 252 is formed with an octagonal end 253. As depicted, pin 252 is fixedly attached to 256A and does not rotate. Pin 252 is threaded for threaded attachment with brackets 256A and 256B. Bushing 254 is solidly mounted to vertical member 234 and fitted with bushing liners 255A and 255B. As depicted, mounting brackets 256A or 256B are also mounted with threaded tolerance bushings 257A or 257B to support rotation of the lateral portion around hinge pin 252. Threaded end cap 259 is attached to pin 252 in assembly and holds the pin 252 within the bushing 254. As in the previous embodiment, the axis of pin 252 is substantially in alignment with the axis of draper hinge rod 330.

A novel and advantageous feature of the present invention is that the hinge 50 is aligned with other elements of the header that must be hinged in order to achieve an overall rotational capability of the lateral portions 24 and 26. The other flexing members of the header must include the draper 18 and its frame and the cutter bar assembly 16. Accordingly, weight supporting frame hinge 50, a draper hinge 130 and a curving portion in the cutter bar assembly 16 are substantially aligned along a single axis. This overall hinge axis is substantially parallel to the direction of travel of the combine or harvester, although it may be tilted in its front to back elevation, as depicted.

Figure 7:
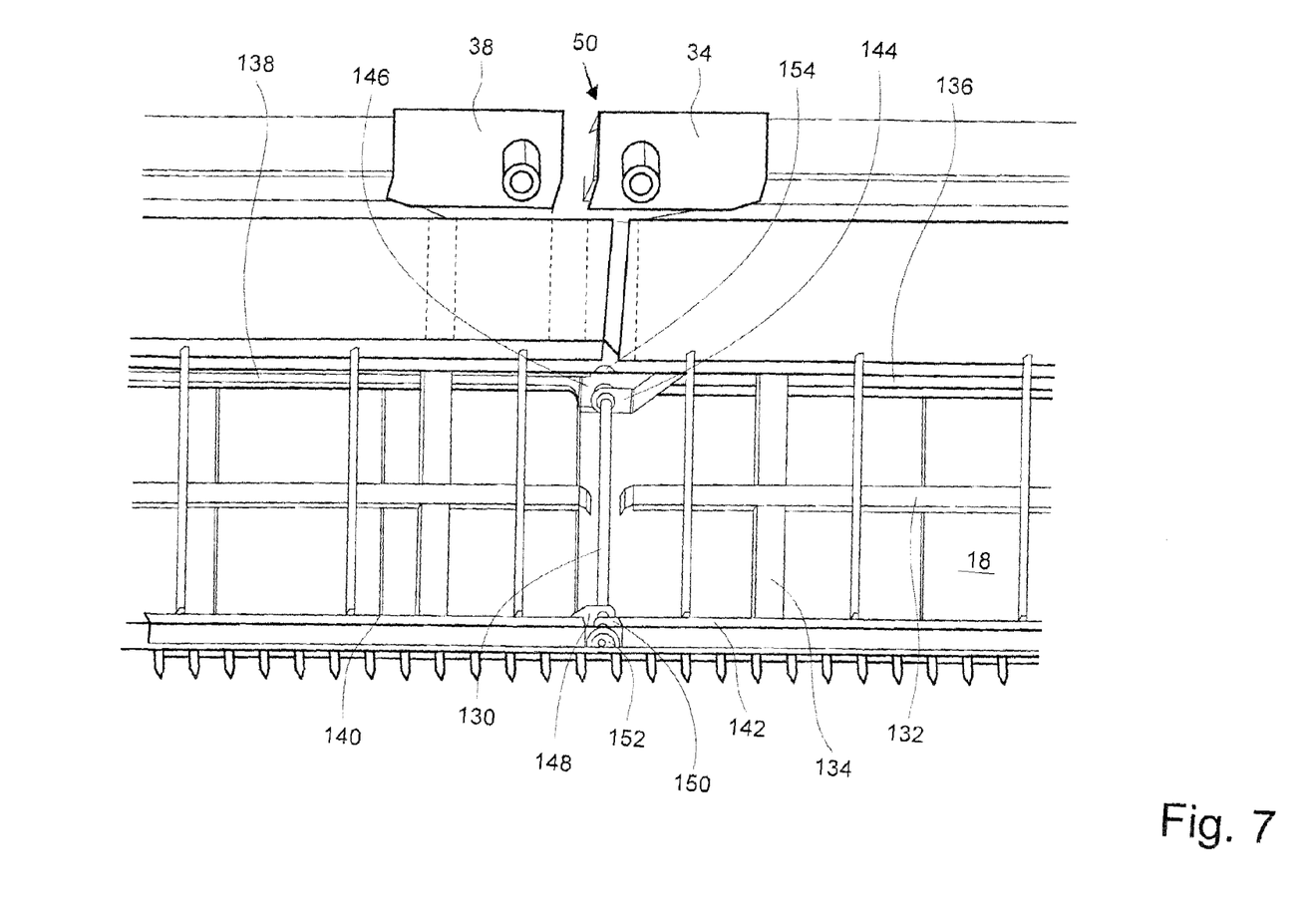
FIG. 7 is a cutaway top perspective view of the hinged draper.

As best seen in transparent view FIG. 7, underneath the draper belt is a frame supporting the belt comprised of a longitudinal member 132 and a plurality of transverse members 134. These frame members comprise a partial surface over which the draper belts 18 can travel in order to transport crop. The frame and belts 18 are bounded by a rear lateral longitudinal support member 136, a rear central longitudinal support member 138, a forward central longitudinal support member 140 and a forward lateral longitudinal support member 142. Each of these support members terminates in a flange or tab having a throughhole 144, 146, 148 and 150, respectively. Forward hinge bushing and tab assembly 152 and rearward hinge bushing and tab assembly 154 secure draper hinge rod 130 and provide for an overall hinge along the axis of rod 130 whereby draper 18 and its frame may flex or bend around rod axis 130. As is illustrated in FIGS. 5 and 7, rod axis 130 is substantially aligned with the axis of weight bearing frame hinge 50.

Figure 8:
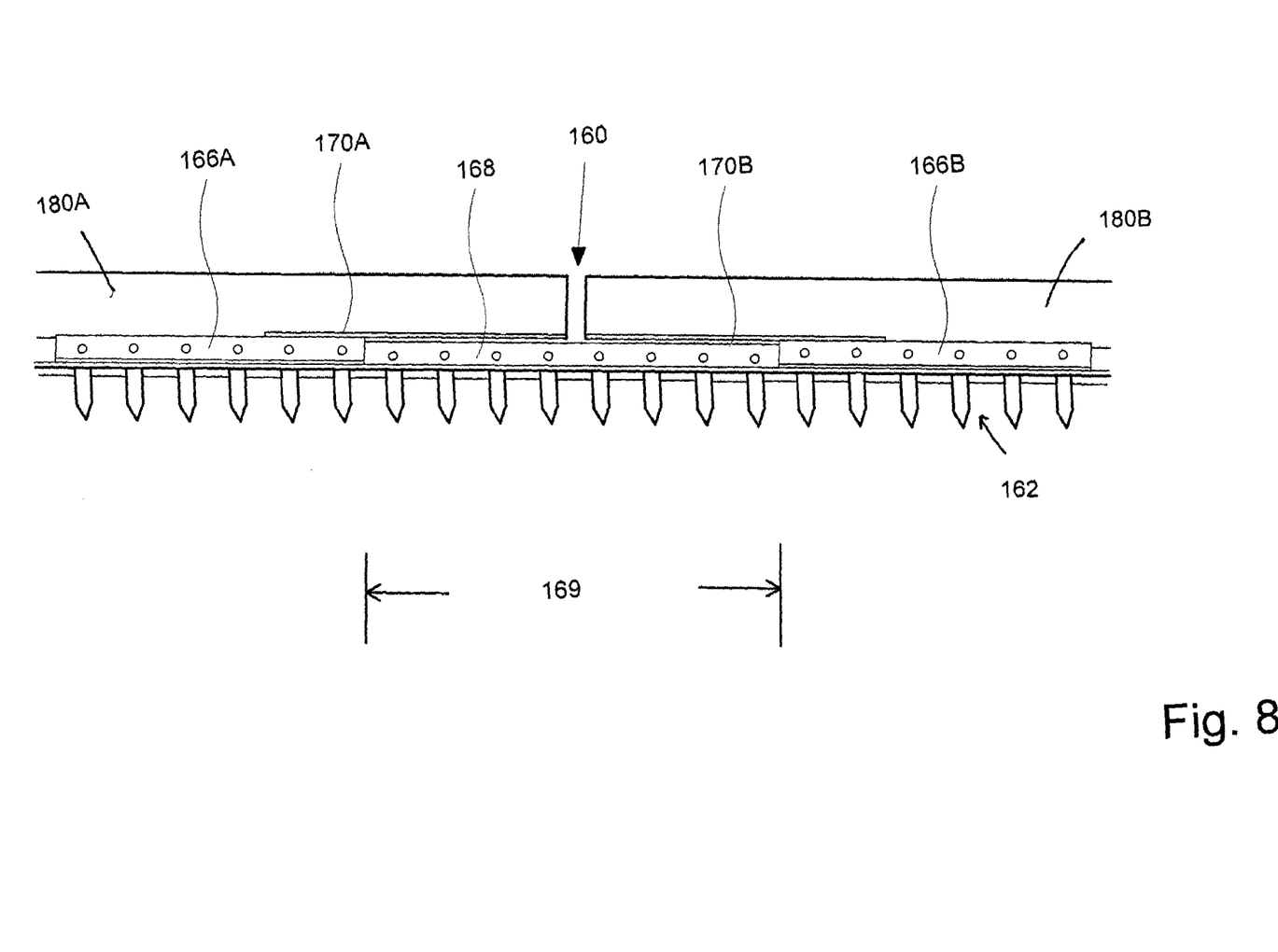
FIG. 8 is an isolated perspective view of the cutter bar assembly.

The cutter bar 16 also flexes along an axis in line with the frame hinge 50 and draper hinge axis 130, at curving portion substantially centered around space 160 (FIG. 8). The moving knife of the cutter bar is made from a high tensile strength flexible steel sufficient to accommodate the plus or minus 4 degrees change in angle of the header portions relative to one another in the depicted embodiment. Knife 162 progresses without interruption through curving portion 160. The cutter bar support members end on either side and adjacent to the curving portion 160. It is anchored in position by mounts 166A and 166B. The knife 162 is restrained from curving away from its supporting cutter bar fingers by a retainer 168 that also proceeds through the curving portion and is similarly flexible. Mounts 166A and 166B are in spaced relation according to dimension 169 in FIG. 8. Dimension 169 is the distance between the inside edges of the mounts 166A and 166B. In the depicted embodiment, this distance is about 908 millimeters, but could be varied, as for example substantially between 900 and 1200 millimeters. It is preconfigured to provide a wide bending radius in which the knife 162 and the retainer 168 can flex. The radius of the depicted embodiment is 14.75 feet. Varying radii may be used, including for example the range of 10 to 20 feet. A wider bending radius will minimize metal fatigue and prolong the operational life of the knife 162 and the retainer 168. A front draper frame wall 170 prevents unwanted material from entering underneath the draper 18. It is divided into sections 170A and 170B which again terminate on either side adjacent to curving portion 160.

Figure 9:
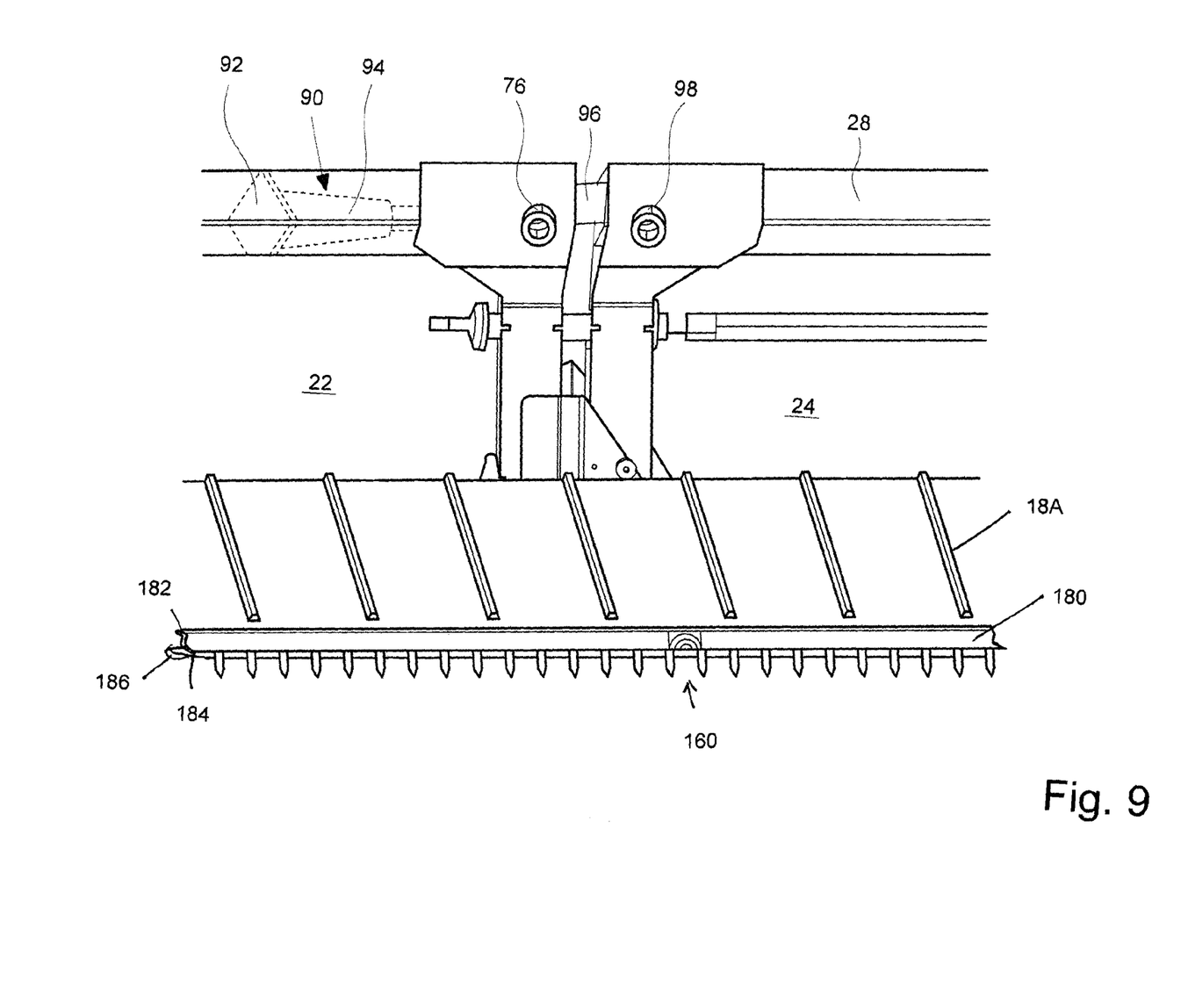
FIG. 9 is a top perspective view of the cutter bar mounted on the header.

The upper aspect of the connection between the central portion 22 and lateral portions 24 and 26 of the header is best seen in FIGS. 3 and 9. There, springs 70 support some of the weight of the lateral portion 24 of the header and mediate its rotation around hinge 50. The springs are anchored at lateral anchor pin 72 on the lateral portion 24. Rods 80 are anchored at their lateral ends at spring caps 74 and are anchored at their medial ends on the central portion 22 at an anchor pin 76 and held there by retainers 82. Anchor pins 72 and 76 are mounted in bushings 73 and 77 respectively The system for mediating rotation of the lateral portion 24 around the hinge 50 is a combination of springs 70 and/or a hydraulic cylinder. The hydraulic assembly 90 is internal to the upper rail 28 in the depicted embodiment. The hydraulic cylinder assembly 90 is best seen in the cutaway view in FIG. 9. There a hydraulic cylinder mount 92 fixedly supports a hydraulic cylinder 94 and its piston 96. The piston extends through the gap in the rail 28 between the central portion 22 and the lateral portion 24 and into the lateral portion 24 to where it is anchored on bushing 98 or an anchor pin mounted in bushing 98. The attachments of the cylinder 90 to its mount 92 and/or of the piston 96 to its bushing 98 may be pivotal to accommodate the rotation of the lateral portion 24. The hydraulic cylinder 90 may be passive and act as a damper to mediate rotation of the lateral portion 24, or, alternatively, it may be an active member responsive to received electrical signals to actuate raising or lowering of the lateral portion by exerting pressure to urge its rotation around hinge 50 in one or the other direction.

Figure 10:
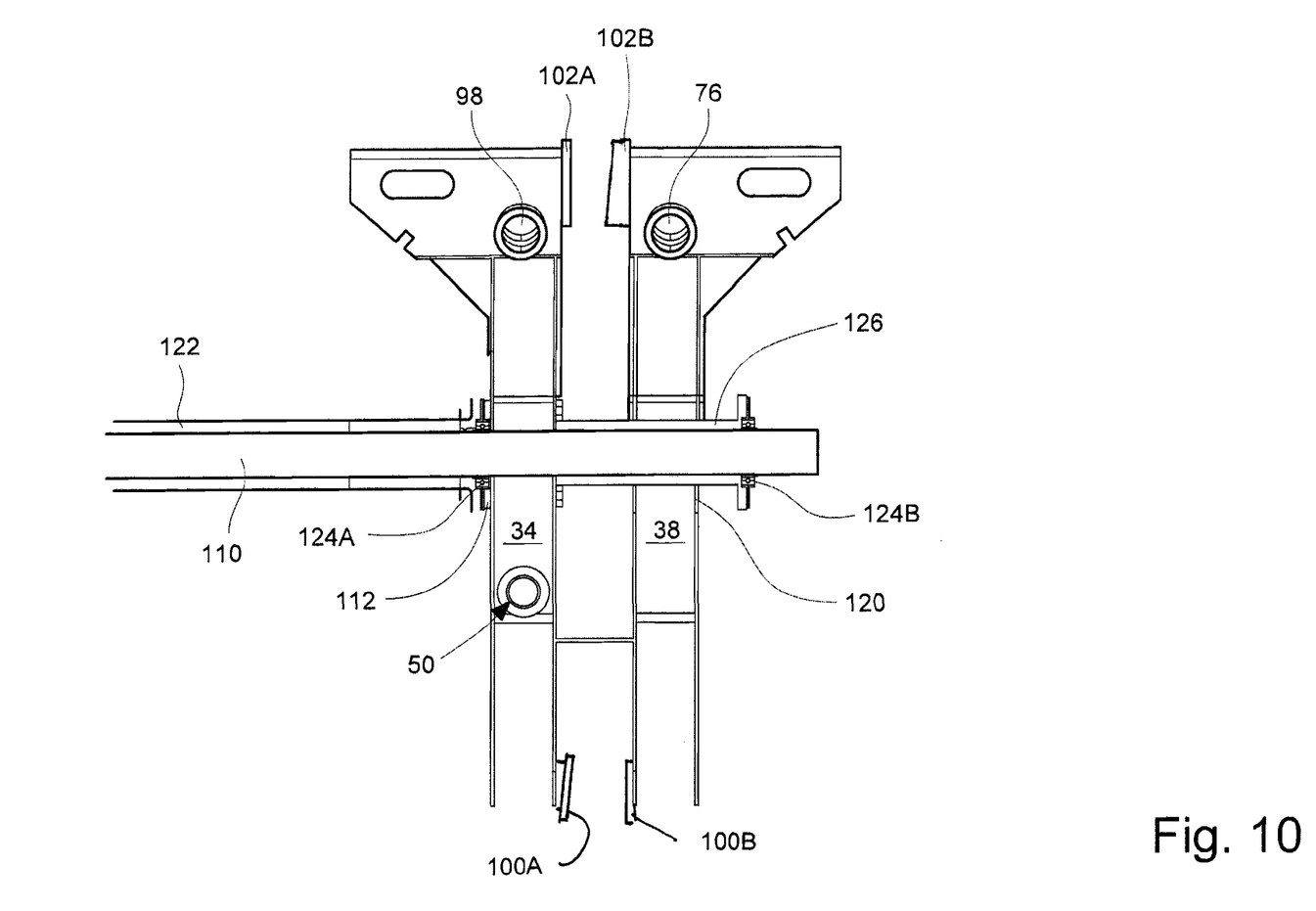
FIG. 10 is a cutaway rear view of a cantilevered drive train.

As is best seen in FIG. 10, the upper rail 28 and lower rail 30 have end stops 100A and 100B for lower rail 30 and 102A and 102B for upper rail 28. These end stops are set at a preconfigured angle in order to provide a mechanical abutment to stop rotation of the lateral member around hinge 50 at a preconfigured angle. In the depicted embodiment the range of motion of the lateral member 24 is plus or minus 4 degrees. The range of motion can be from about 2 to about 7.5°. Various ranges of motion are within the scope of the present invention. The lower stops 100A and 100B stop downward rotation and the upper stops 102A and 102B arrest upwards rotation.

Also provided within the depicted embodiment is a compact profile, robust support for drive train 40. Drive train 40 includes a series of drive shafts 110 which progress through a series of bushings supporting them in each successive vertical support member 32, 34, 36 and 38. Support bushing 112 is fixedly attached to vertical member 34 and drive shaft 110 is mounted to rotate within bushing 112. At the coupling of the lateral portion 24 to the central portion 22 a U-joint mount 114 joins an outer shaft member 110 to an inner shaft member. As can be seen by comparing FIG. 3 with FIG. 10, the medial vertical support member 34 of the lateral portion 24 has a fixed mounting to its bushing 112 at a hole 118 provided for it. The corresponding lateral vertical support member 38 on the central portion 22 has an extended throughhole 120 provided therein which provides for vertical travel of drive shaft section 110 as the lateral portion 24 rotates up and down around hinge 50.

FIG. 10, a cross section, shows the cantilevered drive train in further detail. Drive shaft 110 is supported and shielded by sheath 122. Sheath 122 is fixedly attached to vertical member 34 such that drive shaft 110 extends through hole 118 and vertical member 34 in a fixed relation. A bearing 124A supports the drive shaft 110 and promotes its smooth rotation. A bearing support 126 is also fixedly attached to an inner aspect of vertical member 34, as by a bracket. As before, bearing support 126 supports and protects drive shaft 10. The rotation of drive shaft 110 within sheath 122 and bearing support 126 is also maintained by bearing 124B at a terminal end of bearing support 126. Extending from the inner terminal end of bearing support 126 and from bearing 124B is the U-joint stub 114, positioned ready for engagement with an inner drive shaft to complete the drive train. Because of the vertically oblong dimensions of hole 120 in vertical number 38, as lateral portion 24 rotates around hinge 50 the drive shaft 110 will be free to travel vertically through hole 120 in order to accommodate the relative movement of lateral portion 24 and center portion 22. Driving rotation of the drive shaft 110 through angular variation is accommodated by the U-joint mounted to U-joint stub 114 and to the combine feeder shaft in a known manner.

A leading edge hold down member 180 is provided at the leading edge of the draper belt 18, as seen in FIGS. 8 and 9. The hold down member 180 extends over a leading edge of the draper belt 18 in order to hold it down. It also promotes smooth travel of the crop over the top of the cutter bar and onto the top surface of draper 18. It too is comprised of a central and lateral portion 180A and 180B having a gap therebetween at curving portion 160. The draper hold down 180 is generally in the shape of an S-curve. It proceeds from a top side of the cutter bar and is then angled upwards to the level of the top surface of the draper belt and then angles to a level portion once again to provide a flange disposed over the leading edge of the belt in order to hold it down. The draper belt hold down 180 further prevents the entry of crop, dust and other unwanted materials into the frame and internal draper belt assembly.

Leading edge hold down member 180 is comprised of a top elongated planar aspect 182 that, in the depicted embodiment, is positioned for a bottom surface of upper aspect 182 to closely cooperate with a top surface of draper belt 18 such that member 180 holds the belt down. The rearward extent of the upper aspect 182 is short enough to allow passage of vertical fins 18A, which are periodically attached to the top surface of the draper belt to help urge cut crop along it. A lower aspect 184 of hold down 180 is substantially parallel with upper aspect 182 and disposed to present itself for mounting attachment to cutter bar assembly 16.

A lower shield 186 also serves to keep unwanted material and debris from entering the draper assembly. Like the upper hold down, the lower shield has an upper aspect also disposed to be mounted into the cutter bar assembly 16. A lower aspect is an elongated planar portion dimensioned to be substantially co-planar with a bottom surface of table mounts 42 for attachment to them. An intermediate portion is angled and/or rounded. The transitional portion in addition to keeping unwanted debris from entering the draper assembly also serves to shield the draper assembly and other header components from any impact with the ground.

The lower shield 186 is further divided into separate components along its longitudinal dimension in order to further promote flexion of the curving portion at 160 by maintaining a gap at curving portion 160 between longitudinal sections of 186.

Figure 11:
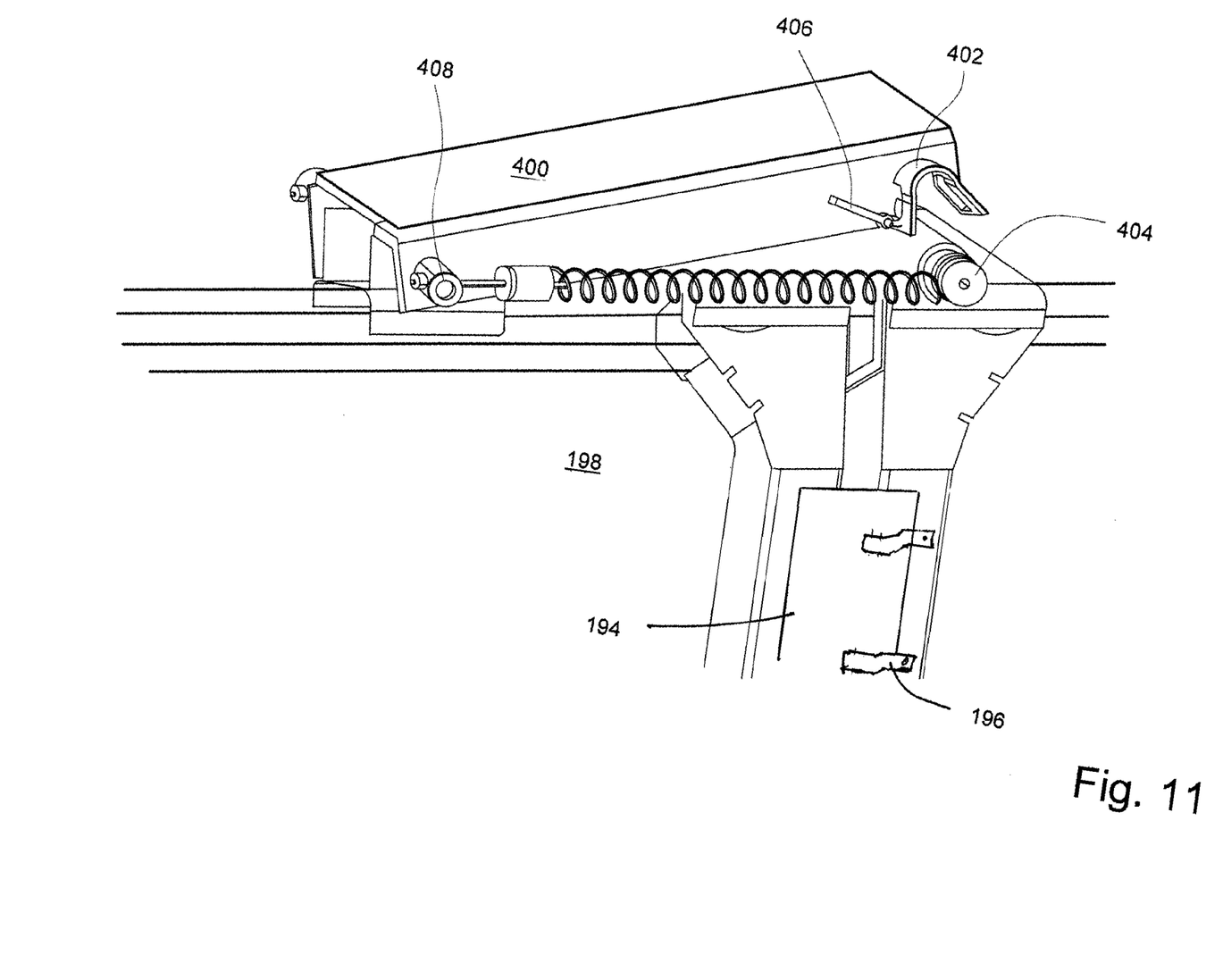
FIG. 11 is a perspective view of a rigid bracket.

Finally, a rear wall is provided in order to serve as a back stop to prevent crop from falling out the back side of the header. FIG. 11 is a rear view of a shield 194 provided to prevent cut crop from leaving the draper belt and entering the gap between the center portion 22 and lateral portion 24. It is held in place by clip springs 196 which are attached to the vertical members 34 or 38. Together with the rear wall panel 198, gap shield 194 provides a continuous rear wall for the header to maintain cut crop on the draper belt 18 as it travels towards the feeder house.

FIG. 11 shows an optional bracket 400 which may be used to render the connection between the center portion 22 and lateral portions 24 or 26 rigid. In FIG. 11, a perspective view, the bracket 400 may be pivotally mounted to one or the other of the header portions and include a notch 402 that corresponds to a pin 404 for selectively latching the bracket 400 to rigidly engage the header portions. This engagement may be maintained and released by latch lever 406. Pivot pin 408 may be permanent, or it may be a detachable insert into one of the bushings 73 or 77, to be held in place with a bolt or pin. Accordingly, in operation an operator may choose to operate a header thus fitted in a rigid configuration for flat ground or in a "floating" configuration as described hereinabove for uneven ground.

As will be apparent to those of skill in the manufacture of combine headers, the robust dimensions of the components of the header and the frame hinge 50 produce a capability to entirely support the weight of a lateral portion. Bracket 400 allows for the optional capacity to manufacture and assemble a header that is either completely rigid—by installing the bracket 400, permanently or detachably—or a header that is flexible as described hereinabove.

Figure 12:
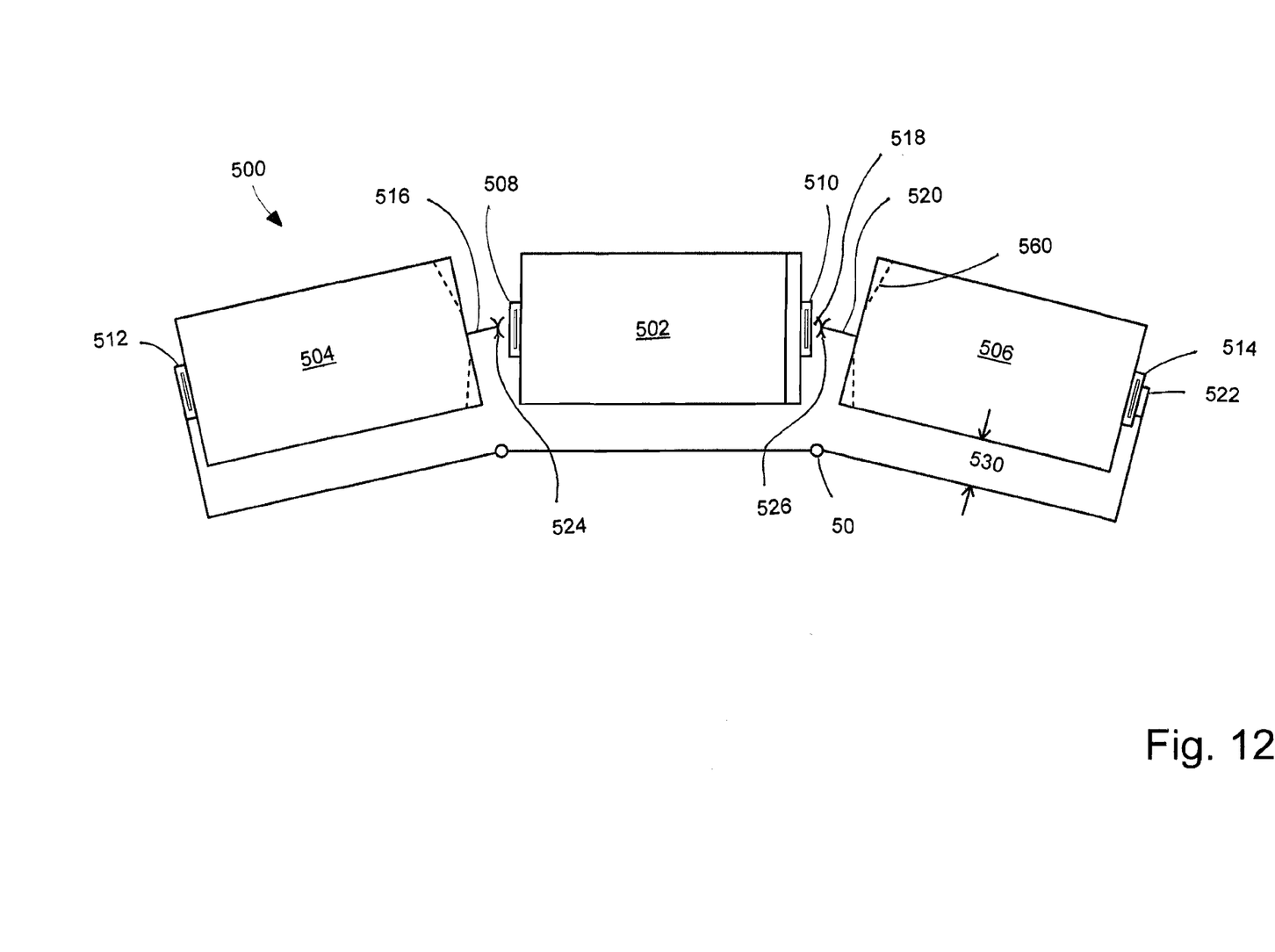
FIG. 12 is a front schematic view of a hinged reel.

FIG. 12 depicts a three part segmented flexing reel for the draper header of the present invention. The flexing reel 500 is comprised of a center portion 502 and two lateral portions 504 and 506. Each section is mounted to its respective header frame sections by mounting arms 508 and 510 for the center section and 512 and 514 for the lateral sections. Each section has a center tube, 516, 518 and 520, which are driven by a drive unit 522 which may be a hydrostatic motor. U-joints 524 and 526 connect the center sections of each lateral portion 504, 506 and the center portion 502. As can be seen, the ability of the reel to flex, in correspondence with the flexion of the lateral head portions 24 and 26 around hinges 50, maintains a constant spacing 530 between the reel bottom and the header table substantially along all portions of the header. Each reel contains its own finger adjustment. Accordingly, the spaced relation 530 between the bottom of the reel and the header table may be adjusted by the operator. Whatever the operator selected reel spacing is, however, will be maintained through the flexion of the reel sections in correspondence with the flexion of the lateral header portions.

Figure 13:
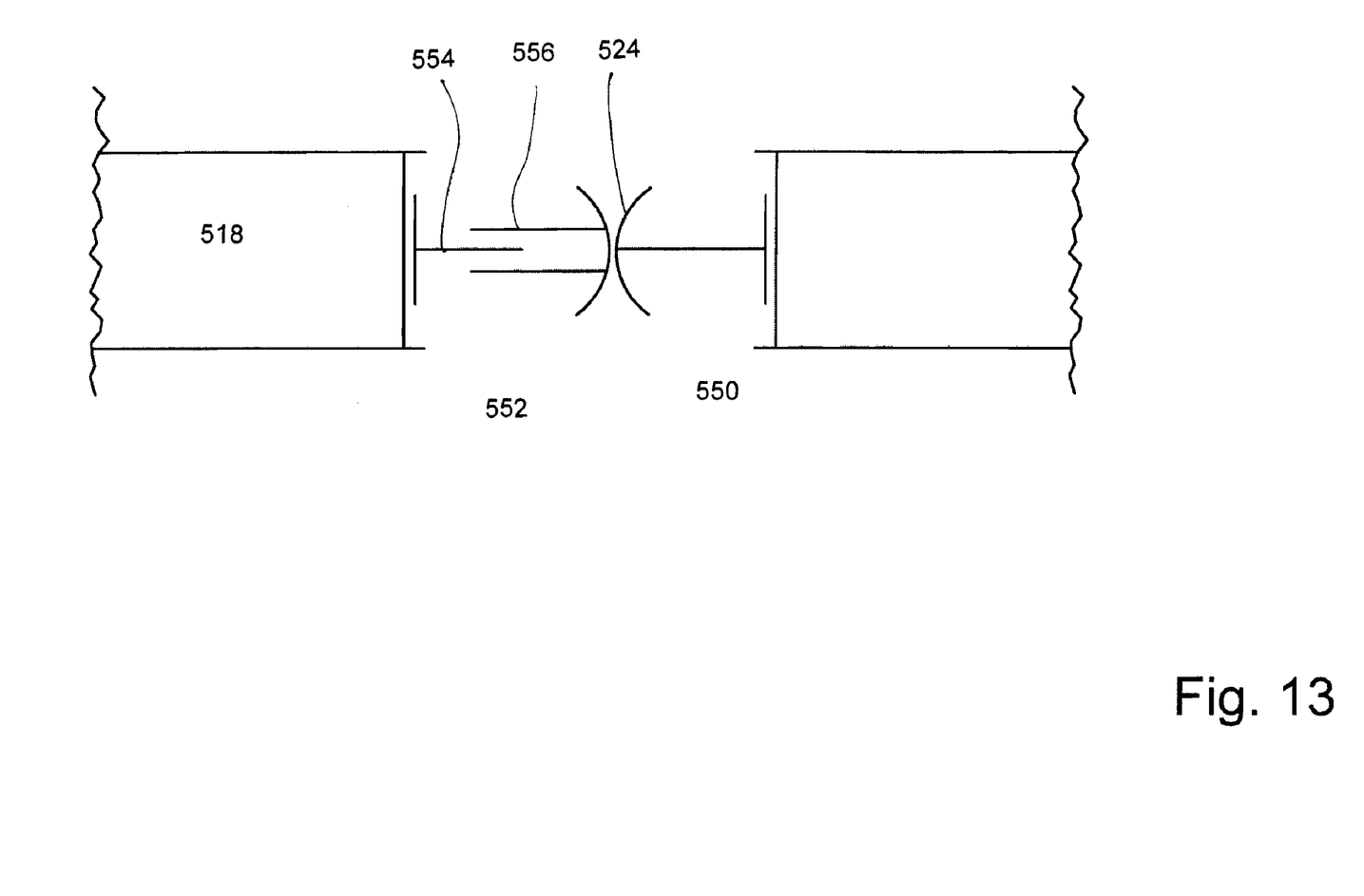
FIG. 13 is a close up of a telescoping reel joint.

In order to accommodate the flexion of the reel sections a novel telescoping shaft for the reel center tubes is provided. In FIG. 13, each reel tube e.g., tube 518 is provided with either a fixed length shaft 550 or a telescoping shaft 552. The telescoping shaft is comprised of a piston 554 and a cylinder 556, one of which is connected to a U-joint, e.g., U-joint 524 and the other which is connected to the reel tube. Optionally, end dimensions of the reel bats facing an adjoining reel may be contoured or angled such as at 560 in order to allow flexion without contact between the separate reel sections.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A header for a combine or a harvester comprising:
   a center portion of said header, said center portion having a feeder house opening disposed to direct cut crop from said center portion to a feeder house when said header is mounted on the feeder house;
   at least one lateral portion of said header, said lateral portion being attached to said center portion by a frame hinge;
   a draper comprised of a center portion draper frame, a lateral portion draper frame, and a belt disposed to rotate over said frame, from said lateral portion to said center portion, and said draper having a draper hinge with said belt spanning said hinge;
   a cutter, said cutter being disposed at a leading aspect of said header to cut crop, said cutter having a curving portion;
   said center portion draper frame and said lateral portion draper frame each having a plurality of support members disposed to form a support over which said belt travels to transport cut crop; and
   said frame hinge, said draper hinge and said curving portion all being substantially along the same axis, said axis being substantially parallel to a direction of travel of the combine or harvester;
   whereby said lateral portion of said header can raise and lower relative to said center portion of said header by rotation around said axis.

2. The header of claim 1 further comprising a hydraulic cylinder operatively connected to an upper aspect of said center portion of said header and operatively connected to an upper aspect of said lateral portion of said header and disposed to mediate rotational travel of said lateral portion relative to said center portion.

3. The header of claim 2 wherein said hydraulic cylinder actuates rotational travel of said lateral portion.

4. The header of claim 1 further comprising a spring operatively connected to an upper aspect of said center portion of said header and operatively connected to an upper aspect of said lateral portion of said header, said spring mediating rotational travel of said lateral portion of said header relative to said center portion of said header.

5. The header of claim 1 further comprising a cantilevered drive train engaged with said central portion of said header and said lateral portion of said header to transfer power from said central portion of said header to said lateral portion of said header.

6. The header of claim 1 further comprising end stops on said central portion of said header and said lateral portion of said header, said end stops being disposed to arrest rotation of said lateral portion of said header around said frame hinge at a preconfigured angle.

7. The header of claim 1 wherein said frame hinge is mounted in a vertical support member.

8. The header of claim 1 wherein said frame hinge is strong enough to support the weight of the lateral portion of said header.

9. The header of claim 1 wherein said frame hinge is within a plane defined by a table of said header.

10. The header of claim 1 further comprising a rigid bracket, said rigid bracket, when installed preventing rotation of said lateral portion of said header around said frame hinge.

11. The header of claim 10 wherein said rigid bracket is hingedly attached to one of said central portion of said header or said lateral portion of said header and said rigid bracket has a latch, engageable with the other of said central portion of said header or said lateral portion of said header, such that by engaging said latch, said rigid bracket arrests rotation of said lateral portion of said header around said frame hinge.

12. The header of claim 1 further comprising a hold down mounted on said cutter bar and disposed to hold down a leading edge of a belt of said draper, and said hold down maintaining a gap, and said gap being aligned with said curving portion of said cutter.

13. The header of claim 1 further comprising a rear wall gap shield, said gap shield preventing the passage of crop between said central portion of said header and said lateral portion of said header and said gap shield being maintained in this position with mounting clips.

14. The header of claim 1 wherein a range of motion of said lateral portion of said header is between about 2 and 7.5 degrees.

15. The header of claim 1 further comprising a reel, said reel being comprised of a center section and at least one other section, each reel section being mounted to a respective one of said header portions, and said center reel and said at least one other reel section being in rotationally driven communication with one another through an axially disposed telescoping U-joint;

whereby, a preconfigured spaced relation between a bottom of each of said reel sections and a table of the header is maintained through flexion of said lateral portions of said header around said frame hinges.

16. The header of claim 1 further comprising a bottom rail, said bottom rail being disposed beneath said axis of said frame hinge.

17. The header of claim 1 wherein said plurality of support members are at least one longitudinal support member and at least one transverse support member.

* * * * *